United States Patent [19]

DeCosse et al.

[11] Patent Number: 4,941,074
[45] Date of Patent: Jul. 10, 1990

[54] LIGHT BOXES

[75] Inventors: Gary A. DeCosse, St. Paul; William B. Wulff, Inver Grove Heights, both of Minn.

[73] Assignee: Road Rescue, Inc., Minn.

[21] Appl. No.: 291,625

[22] Filed: Dec. 29, 1988

[51] Int. Cl.⁵ .............................................. F21V 7/04
[52] U.S. Cl. ....................................... 362/61; 362/32; 362/74; 362/244; 362/341; 362/804
[58] Field of Search ....................... 296/19; 362/32, 61, 362/74, 83.3, 217, 235, 244, 341, 346, 804

[56] References Cited

U.S. PATENT DOCUMENTS

| | | |
|---|---|---|
| 3,317,722 | 5/1967 | Whitney . |
| 3,583,786 | 6/1971 | Marcatili ........................ 350/96 WG |
| 4,260,220 | 4/1981 | Whitehead ........................ 350/96.28 |
| 4,422,719 | 12/1983 | Orcutt ............................... 350/96.30 |
| 4,528,617 | 7/1985 | Blackington ......................... 362/32 |
| 4,536,828 | 8/1985 | Mori ...................................... 362/32 |
| 4,637,686 | 1/1987 | Iwamoto et al. .................. 350/96.29 |
| 4,709,304 | 11/1987 | Mori ...................................... 362/32 |
| 4,737,896 | 4/1988 | Mochizuki et al. ................. 362/301 |
| 4,748,545 | 5/1988 | Schmitt ............................... 362/219 |
| 4,805,984 | 2/1989 | Cobb, Jr. .............................. 362/32 |

FOREIGN PATENT DOCUMENTS 3612178 10/1987 Fed. Rep. of Germany ........ 362/74

OTHER PUBLICATIONS

Article by 3M Titled "3M Brand Scotchlamp Film"

Article Titled Progress in the Development of Prism Light Guides by Steven G. Saxe, Lorne A. Whitehead and Sanford Cobb, Jr.

Primary Examiner—Ira S. Lazarus
Assistant Examiner—Sue Hagarman
Attorney, Agent, or Firm—Jacobson & Johnson

[57] ABSTRACT

An elongated light box for leaking light along its length with the elongated box having a first end and a second end, with the first end including a source of light for directing light toward the second end and the second end including a mirror for reflecting light from the source of light back toward the source of light, the elongated box including an interior surface defining an interior region for transmission of light therethrough, the interior surface having a high light reflecting film extending along a portion of the interior surface, the light reflecting film extending from the light source toward the second end, the high light reflecting film having a general triangular shape that converges from the first end to the second end to thereby provide greater light reflection near the light source; and a light diffuser panel extending along the light box and over the interior region with the light diffuser panel permitting light to leak from the interior region through the light diffuser panel to thereby provide light to the region around the light box.

14 Claims, 3 Drawing Sheets

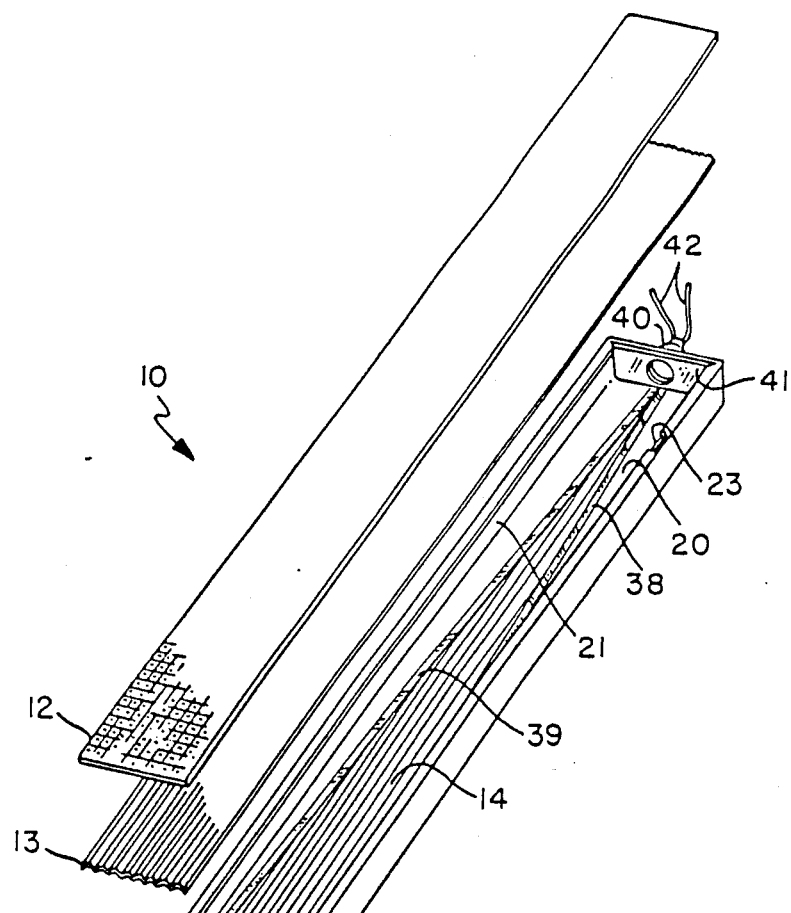
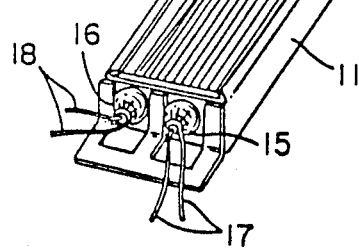
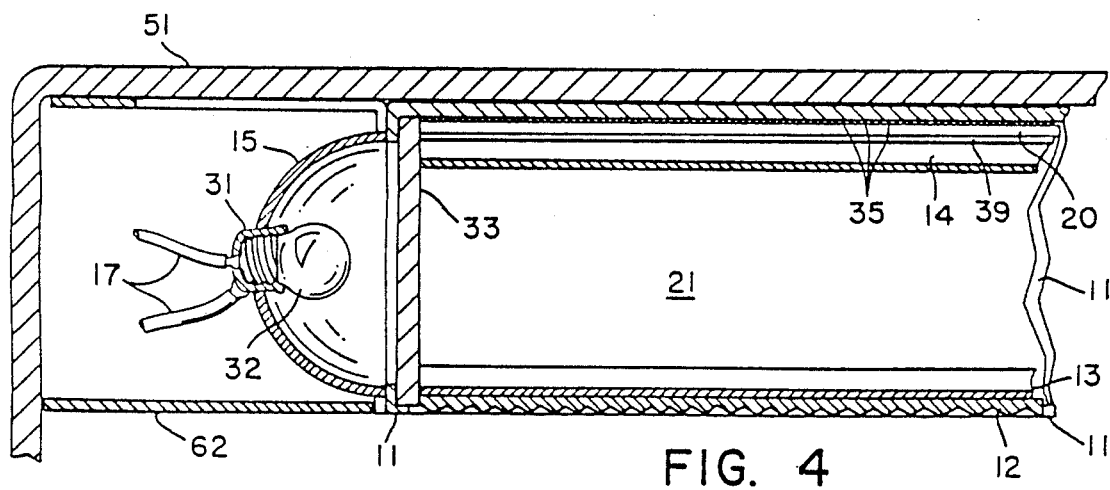
FIG. 3
FIG. 4

LIGHT BOXES

FIELD OF THE INVENTION

This invention relates generally to light boxes and, more specifically, to a light box that can be used in an ambulance to provide the necessary illumination for treating patients as they are transported to a hospital.

BACKGROUND OF THE INVENTION

The concept of light boxes or light tubes wherein a light source located at one end of an elongated fixture transmits light radially outward along the entire length of the elongated fixture is known in the art. One of the difficulties with the use of light boxes as overhead lights in applications as ambulances is that the light boxes generally do not have sufficient, uniform, light output to satisfy minimum Federal lighting requirements for ambulances. The present invention is directed to an improved light box that uses high light reflecting films such as prismatic films. The use of prismatic films or light guides that have substantially 100% total reflection that are located on the interior of the light guide is discussed in the Paper by Stevan G. Saxe titled Progress in the Development of Prism Light Guides A second paper from 3M Center in St. Paul, Minn. describes the 3M Brand Scotchlamp Film that can be used either as a light conduit or as a continuous glowing luminaire. In the 3M light distribution system a light source is located at one end of a light box with a reflective mirror located at the opposite end. The interior of the light box is covered with a conventional white light reflecting material such as white paper or white paint. Inside the light box there is a cylinder of the high light reflecting film that has substantially 100% total internal reflection. This product is sometimes also referred to in the industry as a prismatic film. The use of a high light reflecting film that has substantially 100% total internal light reflection in a light source is described by 3M as being analogous to a perforated garden hose that fills up with water under pressure, with the pressure forcing the water out the perforations along the garden hose. With a tube of the high light reflective film the light is continually reflected inward however, since even the high light reflective films are not 100% perfect, some light does leak out through the film. It is this light that leaks out through the high light reflective film that provides the illumination to the surrounding area that makes light box useful as a light source. The present invention utilizes the existing high light reflective film to produce an improved light output through the arrangement of the high light reflective film and the light reflecting surfaces to provides a low cost light box that provides a uniform cool light output over the entire length of the light box.

DESCRIPTION OF THE PRIOR ART

The prior art concept of a light distribution system is shown in the paper entitled 3M Brand Scotchlamp Film which shows a conventional light source on one end of the light guide and a mirror on the opposite end of a light box. Located on one side of the light box is a rectangular shaped light diffuser panel that covers one face of the light box to permit light to leak out to the surrounding area. The light box includes a rectangular shaped box with an interior cavity which is coated with a conventional light reflecting material such as white paper or white paint. Located inside of the rectangular shaped box is an elongated elliptical shaped cylinder of the high light reflective film of the type manufactured and sold by 3M Company. The high light reflective film differs from the conventional white surface light reflecting surfaces in that the high light reflective film has substantially 100% total internal light reflection of the light rays whereas the white paper of white painted surface absorbs a substantial amount of the light. Such high light reflecting films have been known but have generally been difficult to manfacture until recently. The 3M prior art light system uses a cylinder of high light reflective film to act as a cylindrical guide to direct and redirect the light along the entire length of the light box. In contrast the present invention, through arrangement of two light reflective films and conventional light reflecting and absorbing materials such as white paper, provides a brighter, more uniform light output than the use of the high light reflective film as a continuous interior light guide.

The U.S. Pat. No. 4,260,220 shows a light guide made from a high light reflective film of dielectric material such as plastic that is formed to provide light reflection by use of a surface that provides substantially total internal reflection.

The U.S. Pat. No. 4,536,828 shows a free standing lighting device that is used to convey the outside solar light to the darker interiors of a building with the use of a light guide and a light reflecting surface located in the interior of the building.

The U.S. Pat. No. 4,637,686 shows an optical fiber that uses a light reflecting material to dissipate light leaking out of the cladding layer in the optical fiber.

The U.S. Pat. No. 4,709,304 shows a light radiator that permits the user to move the source of the light from the optical cable back and forth to supply light rays over a wider area.

The U.S. Pat. No. 4,737,896 shows an illumination device that converts the light rays into parallel rays and then directs the parallel rays to an object to be illuminated.

The U.S. Pat. No. 4,748,545 shows an illumination system having a plurality of light sources that are spaced along a reflecting member to thereby direct light over an item on display.

The U.S. Pat. No. 4,528,617 shows a light distribution apparatus for distributing light from a small source over a larger area through internally reflecting the light waves in an integral diffusor and distributor block.

The U.S. Pat. No. 4,422,719 shows a flexible light guide comprised of a transparent plastic core with an outer covering of a tube of plastic material that is shrunk fit onto the plastic core. The flexible light guide is used to light signs and on articles such as bicycles to provide an illuminated rod that can either convey a message or alert someone to the prescence of a bicycler.

The U.S. Pat. No. 3,317,722 shows an electroluminescent lamp having a rigid body with a flexible electroluminescent tape extending through a hollow in the rigid body.

The U.S. Pat. No. 3,583,786 shows an optical wave guide having a hollow glass tube surrounded by pairs of dielectric material and an outer metal coating on the wave guide. The optical wave guide permits the user to transmit light from a source to a load through the hollow glass tube.

SUMMARY OF THE INVENTION

Briefly, the present invention comprises an improved light box that, through arrangement of a high light reflecting film and conventional white background material, provides a light box with a high intensity uniform light output along the entire length of the light box.

BRIEF DESCRIPTION OF THE DRAWINGS

FIG. 3 shows an alternate embodiment of the light box for providing a second source of light;

FIG. 4 shows a sectional view of the end of the light box located in the ceiling of an ambulance.

DESCRIPTION OF THE PREFERRED EMBODIMENT

Figure 1:
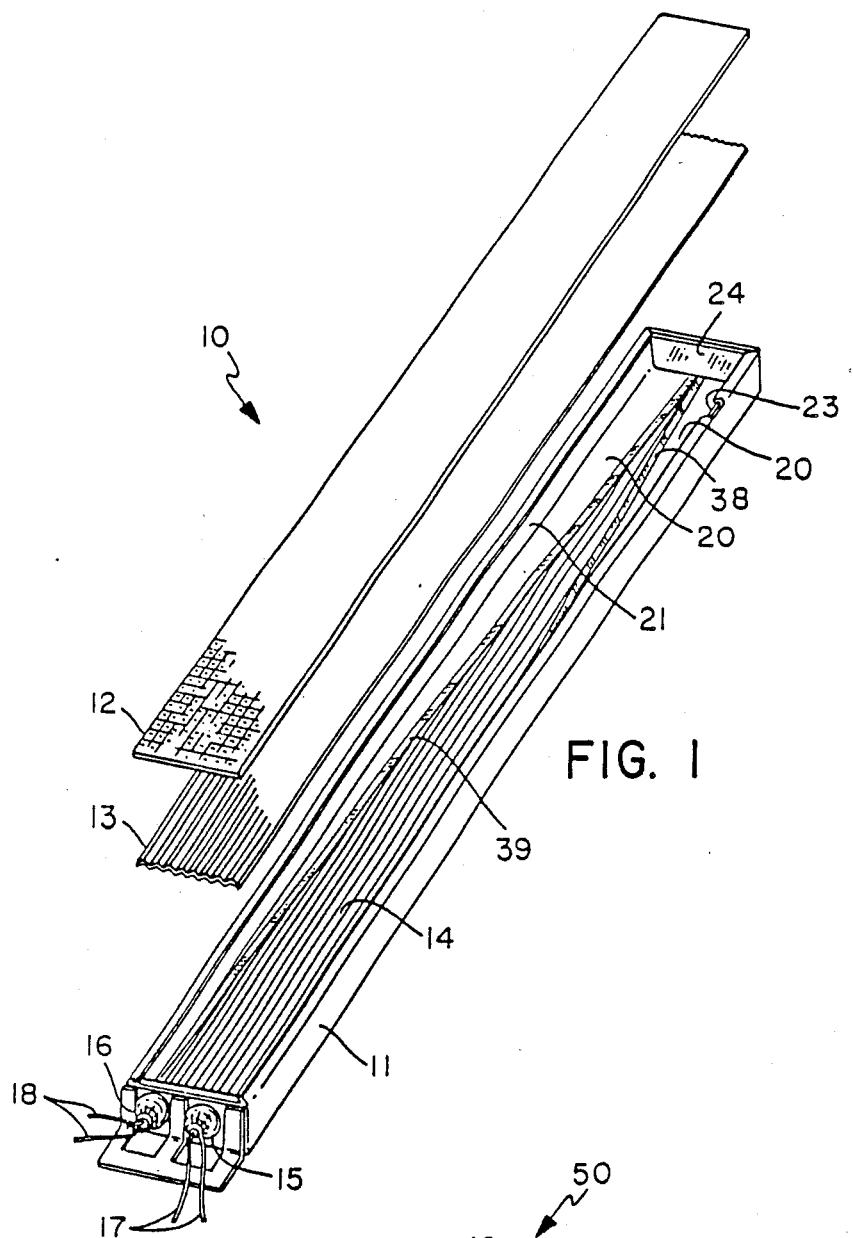
FIG. 1 shows an exploded view of a light box of the present invention.

Referring to FIG. 1 reference numeral 10 identifies the light box of the present invention which is suitable for use in ambulances which require that certain minimum light levels are maintained when the lights are in use. An elongated rectangular open shell 11 extends a length of approximately 6 feet to permit the light box to be mounted crosswise along the entire width of the ambulance body. A layer of high light reflective film 13 forms a cover to shell 11 and is located directly beneath a conventional outer light diffuser panel 12. The high light reflective films are operable to reflect substantially all the light internally and thus maintain as much as possible of the light within the confines of the light box. In the present invention, as in the prior art light boxes, it is the leakage of light through the high light reflective film that is used for illumination of the interior of an ambulance. One type of high light reflective film comprises precision micromachined polymer film that produces prismatic facets which reflect the light internally. Such high light reflective films are sold by the 3M Company in St. Paul, Minn. and are more fully described in the Whitehead U.S. Pat. No. 4,260,220 titled Prism Light Guide Having Surfaces Which Are In Octature, which is cited in the description of the prior art and included herewith. Other types of films that are capable of internally reflecting the light are also usable in the present invention.

The light diffuser panel 12 comprises a rigid panel of polymer plastic or glass that is conventionally used to diffuse light and provide a more uniform dispersion of light before it is emitted into the surrounding atmosphere. Both the diffuser panels and the high light reflective films are well known in the art and have been used to reflect and diffuse light emanating from a light source.

Located on one end of light box 10 are a pair of 12 volt fifty watt incandescent light bulbs that are housed in a first hemispherical reflector housing 15 and a second hemispherical reflector housing 16. Leads 18 connect the light bulb in reflector housing 16 to the electrical system in the ambulance. Similarly, leads 17 connect the light bulb located in reflector housing 15 to the electrical system of the ambulance. Reflective light housings 15 and 16 direct the light from the bulbs located therein through a heat treated glass 33 (see FIG. 3) into the interior of a box that forms an open shell 11. Located on the opposite end of shell 11 is a mirror 24 that reflects light back into the interior of shell 11.

In the prior art light guides the interior of the shell has been provided with a continuous elongated tube of high light reflecting film that forms an elongated light reflecting cylinder along the entire length of the shell.

In the present invention a first rectangular sheet of high light reflective film 12 is located on one side of light box 10 and a second triangular shaped piece of high light reflective film 14 is located on the opposite side of light box 10 and along the bottom of shell 11. The interior side 21 and the interior side 23 of shell 11 are covered with a conventional light reflecting surface such as the white paper with an adhesive backing which is sold by Dupont under the name TYVAK. The purpose of the white surface is to provide a light reflecting surface that has both light reflecting characteristics and light absorbing surfaces, with the light reflecting characteristics of the surfaces substantially less than the substantial 100% total internal reflection produced by the high light reflecting films. Since the white surface is not as effective in reflecting the light as the high light reflective film that is used to reflect and guide the light along the interior of the light box, the light box of the present invention contains two materials of substantially different light reflecting properties that are directly exposed to the light in the interior of the light box. The bottom of shell 11 also contains a sheet of white paper 20 which is secured thereto by an adhesive. The purpose of white paper 20 on the bottom of light box 10 and on the sides 21 and 23 is to provide surfaces that both reflect light and absorb light. The prior art devices such as the 3M light distribution system have used a white paper background on the interior of the light box with a cylindrical tube of high light reflective film for reflecting the light located within the interior of the light box. Surprisingly, the use of the combination of the white background material with a continuous cylinder of high light reflective film located in the light box produces substantially less light and less uniform light output than the present invention which uses both conventional light reflecting surfaces and high light reflecting films exposed to the light on the interior of the light box. In order to maintain the high light reflective film on the bottom of shell 11, I place a strip of white adhesive backed tape 39 along one of the long edges of high light reflective film 14 and a similar strip of white tape 38 along the other long edge of high light reflective film 14.

I have found that the use of a triangular shaped high light reflective film in an arrangement where the high light reflective film on the bottom surface tapers or converges from the light source on one end of the light box to the reflective mirror surface on the opposite end coacts with the other surfaces inside the light box to provide a uniform light output along light tubes up to six feet in length, with the light output being substantially greater than if the entire interior of the shell were covered with the high light reflective film.

Figure 2:
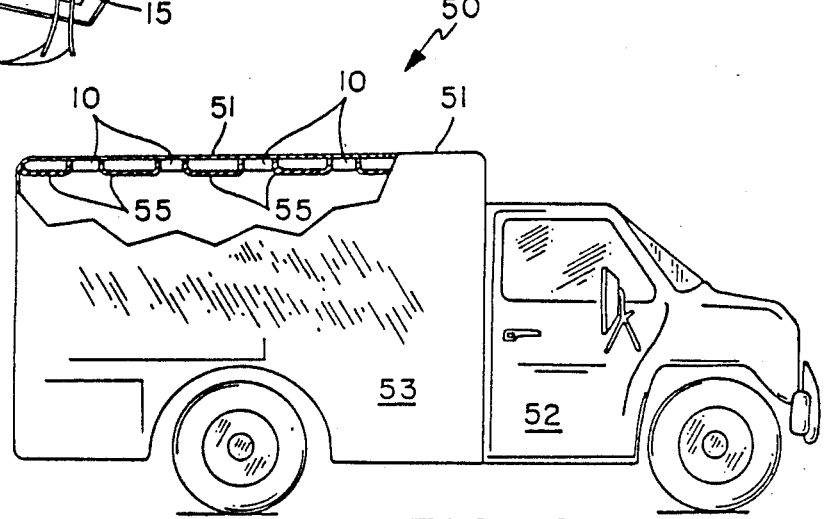
FIG. 2 shows an ambulance having a plurality of light boxes located in the ceiling panels of the ambulance.

FIG. 2 shows a partial cutaway of an ambulance 50. Ambulance 50 includes an ambulance body 53 and a driver's compartment 52. Reference numeral 51 identifies the roof or top of ambulance body 53. Ambulance body 53 has a series of light boxes 10 located between the ceiling panels 55. Ceiling panels 55 and light boxes 10 are attached to roof 51 through suitable fasteners such as screws or the like. The light boxes 10 extend crosswise in the ambulance body 53 to provide a uniform light output in the ambulance body. The recess of the light boxes 10 between ceiling panels 55 permits the light boxes to be unobtrusive to a person or persons in the ambulance body 53.

I have found that the use of a light box with two 12 volt 50 watt incandescent light bulbs and with only partial covering of high light reflective film as shown in FIG. 1 produces a uniform light output of approximately 50 foot candles throughout the ambulance body whereas the prior art light boxes with high light reflective film located along the entire interior of the light box produced uneven lighting with localized light readings in the back of the ambulance of less than the federal required output of 30 to 35 foot candles over 90% of the patient cot area in the ambulance.

Referring to FIG. 3 there is shown an alternate embodiment of my invention that is identical to the light box of FIG. 1 except that in the mirror surface 41 located on the end of the shell 11 I provide an opening for mounting a blue incandescent light 40. While blue is described, other colored lights could also be used in my invention. Light 40 connects to the ambulance lighting system through electrical leads 42. The purpose of having a blue light at one end of the light box is for those situations when the interior of the ambulance requires only a soft light of less intensity. For example, sometimes ambulance light shining on the patient who is under the influence of drugs such as crack can trigger adverse reaction from the patient. In these circumstances, the ambulance operator can shut off one or both of the systems that supply power to leads 17 and 18 and power the blue light 40 located on the opposite end of light box 11 thereby converting the light box to a trauma light for transporting a patient in the ambulance.

Referring to FIG. 4 there is shown a sectional view of ambulance top 51 and shell 11. Shell 11 attaches to the interior of ambulance top 51 through fasteners such as screw fasteners or the like (not shown). Located on the interior of shell 11 is an adhesive 35 that secures white paper 20 to the interior of the shell 11. Located on top of paper 20 is high light reflective film 14 and tape 39 that extends onto high light reflective film 14 to hold film 14 in place within shell 11. On the opposite side of light box 10 is conventional light diffuser panel 12 and high light reflective film 13.

In order to isolate the heat of the light source from the interior of shell 11, I place a piece of heat-tempered glass such as 0.25 inch Pyrex glass across the end of the shell 11 that includes the two 12 volt fifty watt incandescent light bulbs. The glass acts as a thermal barrier to help prevent the heat generated by the bulbs out of shell 11 thereby insuring that the light box remains cool to the touch along the portion of the light box that emits light to the interior of the ambulance body. In addition, the maintaining of the light box in a cool state insures that adhesives used to secure the white paper and the high light reflective film to the interior of the shell do not deteriorate and allow the paper and high light reflective films to slip from their location on the inside of the light box. An opaque panel 62 located next to the wall of the ambulance covers the end of shell 11 to hide the wiring 17 and bulb housings.

Figure 5:
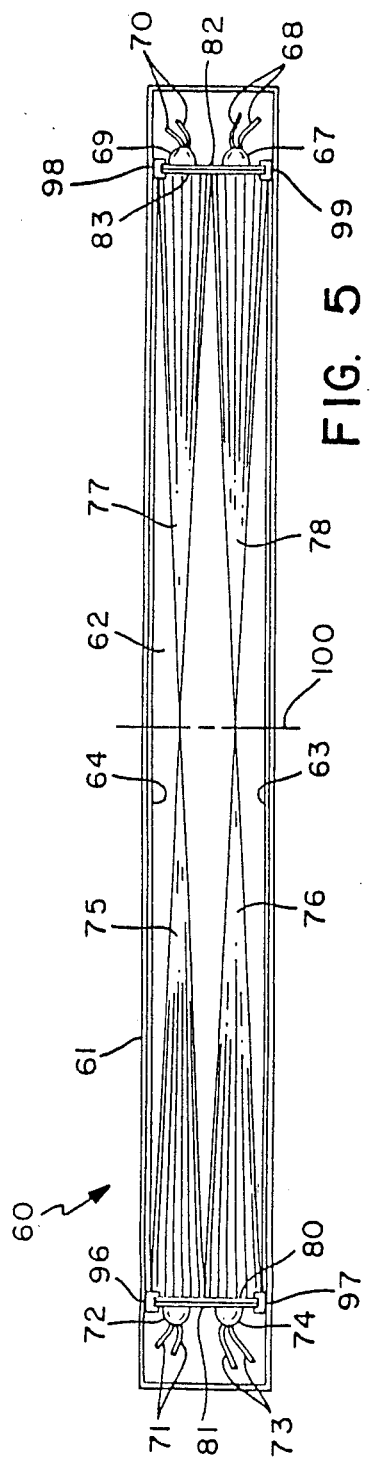
FIG. 5 shows a bottom view of another embodiment of the light box.
Figure 6:
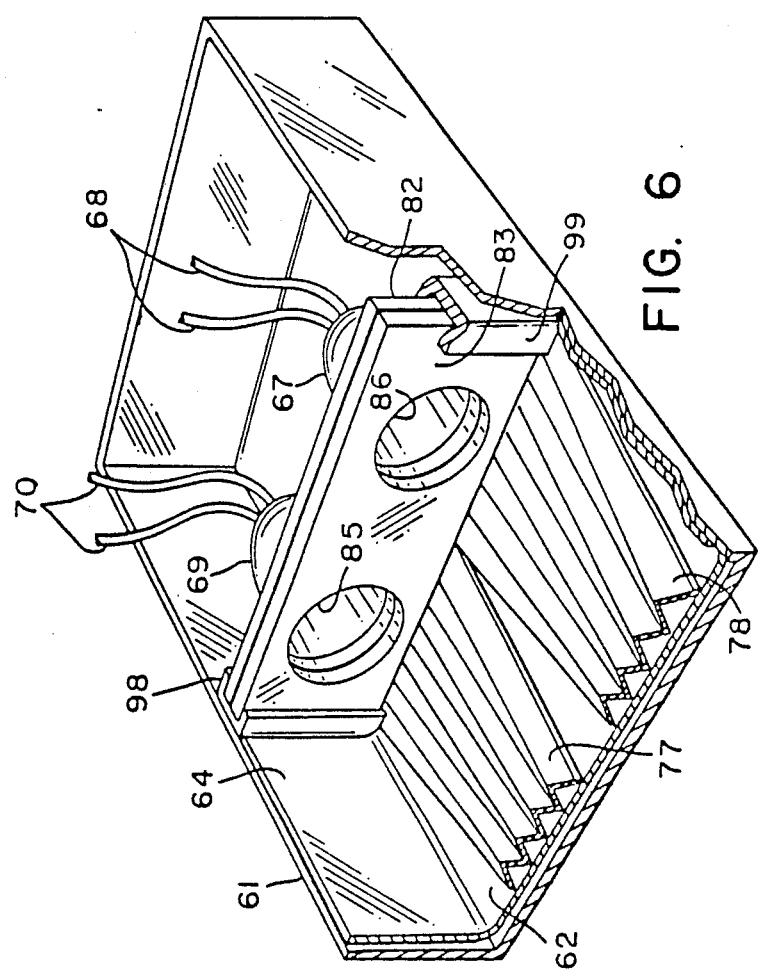
FIG. 6 shows a sectional view of the end of the light box of FIG. 5.

Referring to FIG. 5 and FIG. 6 there is shown another embodiment of the invention that is suitable for longer runs. That is, the embodiment of FIG. 1 to FIG. 3 provides uniform light output for lengths of approximately six feet. For longer runs that will require the same light output one may use the embodiment of FIG. 5 and FIG. 6.

The light box 60 shown in FIG. 5 is similar to the light box 10 FIG. 1 except that in light box 60 the high light reflecting film converges to the middle of the light box from the light bulbs located on opposite ends of the light box 60.

FIG. 5 shows a light box 60 having a metal rectangular shaped housing 61 having an interior surface 62, with upward projecting parallel side walls 63 and 64. Interior surface 62 and side walls 63 and 64 are covered with a conventional white background material such as white paper or white paint. Located on top of interior surface 62 are four separate high light reflecting films 75, 76, 77, and 78 which have been previously described with regard to light box 10. Located on the ends of light box 60 are two sets of lights. On one end of light box 60 there is a light housing 72 and a light housing 74 with each of the housings holding a fifty watt incandescent light bulb. Leads 71 connect the incandescent light bulb in housing 72 to the ambulance interior lighting system while the leads 73 connect the incandescent light bulb in housing 74 to the ambulance interior lighting system. Located across light box 60 and in front of the housings for the lights is a high temperature glass 81 such as PYREX and located on adjacent to glass 81 is a light reflecting surface 80 having openings therethrough to permit the light to enter the interior of the light box 60.

FIG. 6 shows a detail of the opposite end of light box 60 which also has light bulb housings 67 and 69 with incandescent light bulbs located therein and respectively connected to the ambulance lighting system through leads 70 and 68. Similarly, a sheet of high temperature glass 82 covers the light bulb housings to keep the heat generated from the incandescent light bulbs from entering the interior of light box 60. Located on the interior end of light box 60 is a light reflecting surface 83 having a first opening 85 to permit the light from the light bulb in housing 69 to enter the interior of light box 60 and a second opening 86 to permit the light from the light bulb located in housing 67 to enter the interior of the light box 60. Light reflecting surface 83 and light reflecting surface 80 are typically glass mirrors. Glass 81 and mirror 80 are held in place by side clips 96 and 97 while glass 82 and mirror 83 are held in place by side clips 98 and 99.

It should be pointed out that the light box 60 is symmetrical about line 100 extending through the center of light box 60 with identical light housings and associated structure on each end of light box 60.

In the embodiment of FIG. 6 which I use in a light fixture having a length of over eight feet I have provided for a slightly different position of the high light reflecting film on the interior surface 62. A review of FIG. 6 shows that there are four separate triangularly shaped high light reflecting surfaces 75, 76, 77, and 78 located on the interior surface 62. Each of the high light reflecting surfaces converges as it gets farther away from the light source. In light box 10 a single high light reflecting film converges away from two sources of incandescent light while in the light box 60 the high light reflecting film converges away from each of the light sources. In addition, since light sources are located on opposite ends of light box 60, the high light reflecting films converge only to the center of the light box 60 where they meet with the converging high light reflecting film from the opposite end of light box 60. I have found that with such an arrangement and with the light box diffuser panel and high light reflecting film which are identical to those used on light box 10 I can use two larger light fixtures to provide sufficient light for the interior of an ambulance. That is, the light output of light box 60 at the light diffuser panel is approximately 320 foot candles per square inch with two light boxes in an ambulance and the light box having an exterior surface of approximately 1728 square inches. In the light box system using light boxes 10 extending crosswise of ambulance (FIG. 2) I typically use five light boxes that have an average light output at the light box of 292 foot candle per square inch and a total exterior light surface of 1787 square inches. It should be pointed out that in both instances I obtain sufficient light output on the patient cot area to exceed the minimum Federal requirements of 35 foot candles.

Figure 7:
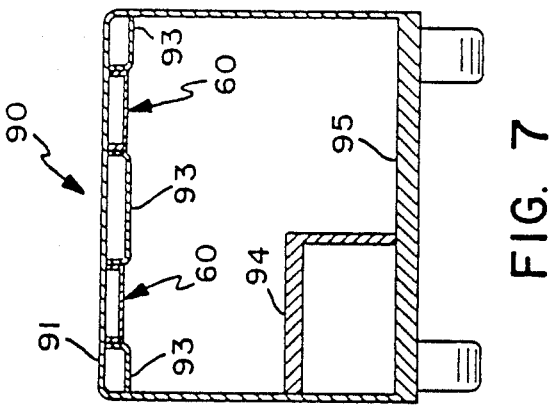
FIG. 7 shows a sectional view of light boxes located in lengthwise in the body of an ambulance.

Referring to FIG. 7, I show a cutaway of the rear of an ambulance 90 that is using two light boxes 60 located lengthwise in the ambulance body 91. Located between light boxes 60 are ceiling panels 93 which are identical to the ceiling panels used with light box 10. The patient cot area is designated by number 94 and shows that in the typical ambulance the patient cot area lies lengthwise in the ambulance body. With the light box 60 located directly above and parallel to the patient cot area 94 I provide for the best lighting along the entire length of the patient, which may be useful if the patient has injuries over his or her entire body such as often occurs in an automobile accident. Thus with the ambulance 90 shown in FIG. 7 the person administrating aid to the victim can stand on floor 95 while the patient's body is bathed in the light emanating from the light box 60, which is directly over the patient and parallel to the patient's body.

I claim:

1. An ambulance for transporting patients comprising:
    a motor vehicle;
    an ambulance body mounted on said motor vehicle to transport a patient, said ambulance body having an interior with a ceiling and a patient cot area;
    a plurality of light boxes, each having a first end and a second end, each of said light boxes including an interior region having interior surfaces, a white reflective surface extending over said interior surfaces, each of said light boxes having a source of light, said plurality of light boxes mounted on said ceiling to thereby provide light to the patient cot area in the interior of said ambulance body, each of said light boxes extending substantially across said ambulance body, each of said light boxes having a high light reflecting film extending along a portion of said white reflective surface, said high light reflecting film extending away from said source of light, said high light reflecting film comprising a general triangular shape that converges from said first end to said second end to thereby provide greater light reflection in the area proximate said source of light; and
    each of said plurality of light boxes having a panel extending along said light boxes, said panels extending over said interior region of each of said light boxes, said panel permitting light to leak from said interior region through said panel to thereby provide light to the patient cot area on the interior of said ambulance body whereby said light illumination from said plurality of light boxes is at least 35 to 40 foot candles over at least 90% of said patient cot area.

2. The ambulance of claim 1 wherein said light boxes are located in a parallel spaced relation on said ceiling of said ambulance.

3. The ambulance of claim 2 wherein one of said light boxes includes a second light source at said second end to thereby provide a trauma light for said ambulance.

4. The ambulance of claim 3 wherein said light boxes are at least six feet long.

5. The ambulance of claim 4 wherein said light boxes are located in recessed areas in said ceiling.

6. An ambulance having a light box for distributing light to a patient cot area within said ambulance, said light box including a shell having an interior surface, said shell having a first end and a second end with a light source at one end and a light reflective surface at the opposite end of said shell, a white reflective surface located on said interior surface of said shell with a high light reflecting film and a light diffuser panel extending along said shell to diffuse the light emanating from said shell; the improvement comprising a sheet of high light reflecting film extending over only a portion of the interior of said shell to provide a decreasing surface of high light reflecting film for the light traveling from said light source to said light reflective surface to thereby provide a uniform light output.

7. An elongated light box for emitting light along its length comprising:
    an elongated box, said elongated box having a first end and a second end, said first end including a source of light for directing light toward said second end, said second end including a source of light for directing light toward said first source of light, said elongated box including an interior surface having a white reflective surface, said interior surface defining an interior region for transmission of light therethrough, said interior surface having a first high light reflecting film and a second high light reflecting film extending along a portion of said interior surface, said first high light reflecting film extending from said first light source toward said second end, said first high light reflecting film comprising a general triangular shape that converges away from said first light source, said second high light reflecting film extending along a further portion of said interior surface, said second high light reflecting film extending from said second light source toward said first end, said second high light reflecting film comprising a general triangular shape that converges away from said second light source;
    a panel extending along said light box and over said interior region, said panel permitting light to leak from said interior region through said panel to thereby provide light to the region around said light box.

8. The light box of claim 7 wherein said panel includes a third high light reflecting film located along said panel.

9. The light box of claim 8 wherein said first light source and said second light source comprises at least two light bulbs located in each of said light sources.

10. The light box of claim 7 wherein said elongated light box includes at least four high light reflecting films located on said interior surface.

11. The light box of claim 7 wherein said first high light reflecting film and said second high light reflecting film converge to a point midway between said first light source and said second light source.

12. The light box of claim 7 including an ambulance body with an elongated cot located in said ambulance body with said light box extending parallel to said elongated cot to provide a uniform distribution of light along the length of a patient's body on said elongated cot.

13. The light box of claim 7 including an ambulance body having a front and a rear, said ambulance body having a ceiling and a pair of said light boxes extending along said ambulance body in a direction from the rear to the front of said ambulance body.

14. The light box of claim 7 wherein said light box is at least six feet in length.

* * * * *